(12) United States Patent
Tiwari

(10) Patent No.: US 9,072,075 B2
(45) Date of Patent: Jun. 30, 2015

(54) METHOD OF HANDLING EMERGENCY BEARER SERVICE IN WIRELESS COMMUNICATION SYSTEM

(75) Inventor: Kundan Tiwari, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 0 days.

(21) Appl. No.: 13/353,300

(22) Filed: Jan. 18, 2012

(65) Prior Publication Data

US 2013/0016607 A1    Jan. 17, 2013

Related U.S. Application Data

(60) Provisional application No. 61/434,103, filed on Jan. 19, 2011.

(51) Int. Cl.
| | | |
|---|---|---|
| H04W 28/10 | (2009.01) | |
| H04W 76/00 | (2009.01) | |
| H04W 28/02 | (2009.01) | |
| H04W 60/06 | (2009.01) | |

(52) U.S. Cl.
CPC ............ *H04W 76/007* (2013.01); *H04W 28/02* (2013.01); *H04W 60/06* (2013.01)

(58) Field of Classification Search
CPC ..... H04W 48/06; H04W 60/06; H04W 28/02; H04W 76/007
USPC .................................................. 370/229, 230
See application file for complete search history.

(56) References Cited

U.S. PATENT DOCUMENTS

| | | | | |
|---|---|---|---|---|
| 5,937,355 | A  * | 8/1999  | Joong et al. | 455/466 |
| 6,356,755 | B1 * | 3/2002  | Valentine et al. | 455/435.1 |
| 7,469,145 | B2 * | 12/2008 | Li | 455/450 |
| 7,860,976 | B2 * | 12/2010 | Hurtta | 709/227 |
| 8,170,566 | B2 * | 5/2012  | Pudney | 455/445 |
| 8,184,002 | B2 * | 5/2012  | Zhang et al. | 340/540 |
| 8,301,955 | B2   | 10/2012 | Benveniste | |

(Continued)

FOREIGN PATENT DOCUMENTS

| | | |
|---|---|---|
| CN | 1719801 A | 1/2006 |
| CN | 1905526 A | 1/2007 |

(Continued)

OTHER PUBLICATIONS

3GPP TS 24.008 V10.1.0 (Dec. 2010) Technical Specification 3rd Generation Partnership Project; Technical Specification Group Core Network and Terminals; Mobile radio interface Layer 3 specification; Core network protocols; Stage 3 (Release 10), p. 375-552.

(Continued)

*Primary Examiner* — Chi H Pham
*Assistant Examiner* — Robert Lopata
(74) *Attorney, Agent, or Firm* — Winston Hsu; Scott Margo

(57) ABSTRACT

A method of handling an emergency bearer service for a mobile station in a wireless communication system is disclosed. The method comprises receiving an attach rejection message with a back-off timer when a network node is applying a non-access stratum (NAS) level congestion control, wherein the attach rejection message is used for rejecting a normal attach procedure; and initiating a packet switch (PS) emergency attach procedure when a PS emergency bearer service is initiated during a time of the back-off timer being running.

9 Claims, 4 Drawing Sheets

(56) References Cited

U.S. PATENT DOCUMENTS

| | | | |
|---|---|---|---|
| 8,406,202 B2* | 3/2013 | Tiwari | 370/335 |
| 2008/0117869 A1 | 5/2008 | Freen | |
| 2009/0149179 A1 | 6/2009 | Shim | |
| 2010/0297979 A1* | 11/2010 | Watfa et al. | 455/404.1 |
| 2011/0170410 A1* | 7/2011 | Zhao et al. | 370/232 |
| 2011/0188411 A1* | 8/2011 | Faccin et al. | 370/259 |
| 2011/0275342 A1* | 11/2011 | Ramle et al. | 455/404.1 |
| 2012/0002545 A1* | 1/2012 | Watfa et al. | 370/235 |
| 2012/0044867 A1* | 2/2012 | Faccin et al. | 370/328 |
| 2012/0082029 A1* | 4/2012 | Liao | 370/230 |
| 2012/0106332 A1* | 5/2012 | Tiwari | 370/230 |
| 2012/0115492 A1* | 5/2012 | Liao | 455/445 |
| 2012/0182912 A1* | 7/2012 | Watfa et al. | 370/311 |

FOREIGN PATENT DOCUMENTS

| | | |
|---|---|---|
| CN | 101283618 A | 10/2008 |
| KR | 1020090061244 A | 6/2009 |
| KR | 1020090078735 A | 7/2009 |

OTHER PUBLICATIONS

3GPP TS 23.060 V10.2.0 (Dec. 2010) Technical Specification 3rd Generation Partnership Project; Technical Specification Group Services and System Aspects; General Packet Radio Service (GPRS); Service description; Stage 2 (Release 10), p. 27-35.

European patent application No. 12000332.2, European Search Report mailing date:Jul. 5, 2012.

Nokia Siemens Networks, Nokia, "Clarification of back-off timer usage", 3GPP TSG SA WG2 Meeting #81, S2-104939, Oct. 11-15, 2010, Prague, Czech Republic, XP050459721, p. 1-5.

Ericsson, "GPRS Attach for emergency services", 3GPP TSG CT WG1 Meeting #59, C1-093170, Jun. 22-26, 2009, Los Angeles (USA), XP050350167, p. 1-13.

Samsung, "NAS rejection and backoff inapplicable to IMS APN", 3GPP TSG-SA WG2 Meeting #81, S2-104592, Oct. 11-15, 2010, Prague, Czech Republic, XP050459381, p. 1-3.

3GPP TS 23.401 V10.2.0 (Dec. 2010), "3rd Generation Partnership Project; Technical Specification Group Services and System Aspects; General Packet Radio Service (GPRS) enhancements for Evolved Universal Terrestrial Radio Access Network(E-UTRAN) access(Release 10)", XP050462136, p. 1-276.

3GPP TS 23.060 V10.2.0 (Dec. 2010), Technical Specification, 3rd Generation Partnership Project; Technical Specification Group Services and System Aspects; General Packet Radio Service (GPRS); Service description; Stage 2 (Release 10), p. 1-316.

European patent application No. 12004978.8, European application filing date: Jan. 19, 2012, European Search Report mailing date: Mar. 13, 2013.

3GPP TS 24.008 V10.1.0 (Dec. 2010), "3rd Generation Partnership Project; Technical Specification Group Core Network and Terminals; Mobile radio interface Layer 3 specification; Core network protocols; Stage 3 (Release 10)", XP050462277, p. 1-625.

HTC, "Add network-initiated EPS bearer deactivation with back-off timer for APN based congestion control", 3GPP TSG SA WG2 Meeting #81, S2-104558, Oct. 11-15, 2010, Prague, Czech Republic, XP050459469.

Office action mailed on Mar. 22, 2013 for European application No. 12004978.8, filing date Jan. 19, 2012, Cover page+ p. 1-6.

KPN, NTT DoCoMo, Orange, Huawei, NAS level reject per APN with back-off timer function, 3GPP TSG SA WG2 Meeting #80, S2-104346, Aug. 30-Sep. 3, 2010, p. 1-3, Brunstad, Norway.

ETRI, NAS-level back-off timer to. reject Attach request, 3GPP TSG-CT WG1 Meeting #67, C1-103895, Oct. 11-15, 2010, p. 1-8, Barcelona, Spain.

Office action mailed on Sep. 5, 2013 for the Korean application No. 10-2012-0006328, filing date Jan. 19, 2012, pp. 1-4.

3GPP TS 24.008 V9.0.0 (Sep. 2009), Technical Specification, 3rd Generation Partnership Project; Technical Specification Group Core Network and Terminals; Mobile radio interface Layer 3 specification; Core network protocols; Stage 3 (Release 9), cover page + p. 117.

Office action mailed on Jul. 30, 2013 for the Japanese application No. 2012-009152, filing date Jan. 19, 2012, pp. 1-2.

Notice of allowance mailed on Jan. 28, 2014 for the Korean Application No. 10-2012-0006328, filing date Jan. 19, 2012, pp. 1-2.

Office action mailed on Jan. 30, 2014 for the China application No. 201210017797.7, filing date Jan. 19, 2012.

Notice of allowance mailed on Jul. 29, 2014 for the Japanese application No. 2012-009152, filing date Jan. 19, 2012, pp. 1-3.

KPN, Orange, Sierra Wireless, NSN, NAS level reject of Attach, 3GPP TSG-SA WG2 Meeting #82, S2-106011, Nov. 15-19, 2010, Jacksonville, Florida, USA.

HTC, Clarification on detach procedure for a back-off UE, 3GPP TSG SA WG2 Metting #85, S2-112256, May 16-20, 2011, Xi' An, P.R. China.

Office action mailed on May 16, 2014 for the Taiwan application No. 101102176, filing date Jan. 19, 2012, p. 1-5.

\* cited by examiner

METHOD OF HANDLING EMERGENCY BEARER SERVICE IN WIRELESS COMMUNICATION SYSTEM

CROSS REFERENCE TO RELATED APPLICATIONS

This application claims the benefit of U.S. Provisional Application No. 61/434,103, filed on Jan. 19, 2011 and entitled "Method to handle Emergency call in case of NAS level Congestion in the network", the contents of which are incorporated herein in their entirety.

BACKGROUND OF THE INVENTION

1. Field of the Invention

The present invention relates to a method used in a wireless communication system, and more particularly, to a method of handling an emergency bearer service for a mobile station in a wireless communication system.

2. Description of the Prior Art

A GSM (global system for mobile communication) system, initiated by the third generation partnership project (3GPP), is now being regarded as anew radio interface and radio network architecture that provides a high data rate, low latency, packet optimization, and improved system capacity and coverage. In the GSM system, an UTRAN (universal terrestrial radio access network, UTRAN) includes a plurality of base stations and communicates with a plurality of mobile stations (MSs), also referred as to user equipments (UEs). In GSM system, a network node, e.g. a Serving GPRS Support Node (SGSN), is responsible for the delivery of data packets to the mobile devices back and forth within its geographical service area, including packet routing and transfer, mobility management (attach/detach and location management), logical link management, and authentication and charging functions.

A General packet radio service (GPRS) is a packet oriented mobile data service on GSM cellular communication systems. GPRS enhances the second generation (2G) phones to enable them to send and receive data more rapidly. With a GPRS connection, the phone is "always on" and can transfer data immediately, and at higher speeds: typically 32-48 kbps. An additional benefit is that data can be transferred at the same time as making a voice call. GPRS is now available on most new phones. GPRS is part of a series of technologies that are designed to move the 2G networks closer to the performance of 3G (the third generation) networks. The key characteristic of a 3G network is its ability to transfer large amounts of data at high speed (up to 2 Mbps), enabling applications like video calling, video downloads, web browsing, email, etc. By increasing the speed of a 2G network, some of these applications become possible, e.g. web browsing and sending or receiving emails with large attachments.

An access point name (APN) is used for establishing packet data connections, and is managed by the MME. Further, the APN is used for identifying a packet data network (PDN) or a service type (e.g. multimedia messaging service (MMS)), wherein the PDN or the service type is carried on the packet data connections.

NAS level congestion control contains the functions: "APN based congestion control" and "General NAS level Mobility Management control". The use of APN based MM/SM (mobility management/session management) congestion control is for avoiding and handling of MM and SM signalling congestion associated with UEs with a particular APN. With General NAS level mobility management control, the SGSN may also use the reject of NAS level Mobility Management signaling requests under general congestion conditions.

The SGSN may store a mobility management (MM) back-off time and a session management (SM) back-off time when congestion control is active for general NAS level MM congestion control or APN based SM/MM congestion control. The SGSN may enforce the stored back-off time by immediately rejecting any subsequent request from the UE targeting at connecting to the APN before the stored back-off time is expired.

A network node will reject the MS with GMM (GPRS Mobility Management) back-off timer when the network node is applying NAS level congestion control either due to congestion in network being caused due to particular APN or due to General NAS level congestion in the network. The MS during the back off time shall not initiate GMM signalling besides the emergency procedure.

A MS camped normally on a cell will perform the normal attach procedure to get emergency bearer services i.e. a MS will send ATTACH REQUEST message with attach type "GPRS attach" or combined attach depending on network mode of operation (NMO) of the cell. If a MS whose attach procedure is rejected by the network node with GMM back off timer when the network node is applying General NAS level congestion control initiates the emergency attach procedure on normal cell on sending ATTACH REQUEST message with attach type "GPRS attach" or combined GPRS/IMSI attach then the network node will reject the attach procedure again when the network node is running GMM back-off timer and it is not expired. Then the MS will not able to get the emergency bearer services till the back-off timer expires.

In addition, a MS will perform the combined attach procedure for packet switched/circuit switched (PS/CS) services when the network mode of operation (NMO) is NMOI or the MS is configured to use the extended NMO I system information and extended NMO I system information indicates NMO I.

When the MS attached for combined CS/PS services detaches from IMSI services only then it will send detach request message with detach type "IMSI detach". During this time if the network node is applying the NAS level congestion control then the network node will not able to send GMM back-off timer is detach accept message as detach accept message currently doesn't contain the back-off timer IE. The MS will be rejected in next GMM signalling message with back-off timer.

SUMMARY OF THE INVENTION

The disclosure therefore provides a method of handling an emergency bearer service for a mobile station.

A method of handling an emergency bearer service for a mobile station in a wireless communication system is disclosed. The method comprises receiving an attach rejection message with a back-off timer when a network node is applying a non-access stratum (NAS) level congestion control, wherein the attach rejection message is used for rejecting a normal attach procedure; and initiating a packet switch (PS) emergency attach procedure when a PS emergency bearer service is initiated during a time of the back-off timer being running.

A method of a congestion control for a network node in a wireless communication system is disclosed. The method comprises receiving a detach request message from a mobile station; and sending a detach accept message with an IMSI detach type and a back-off timer in response to the detach request message when the network node is applying a non-access stratum (NAS) level congestion control.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
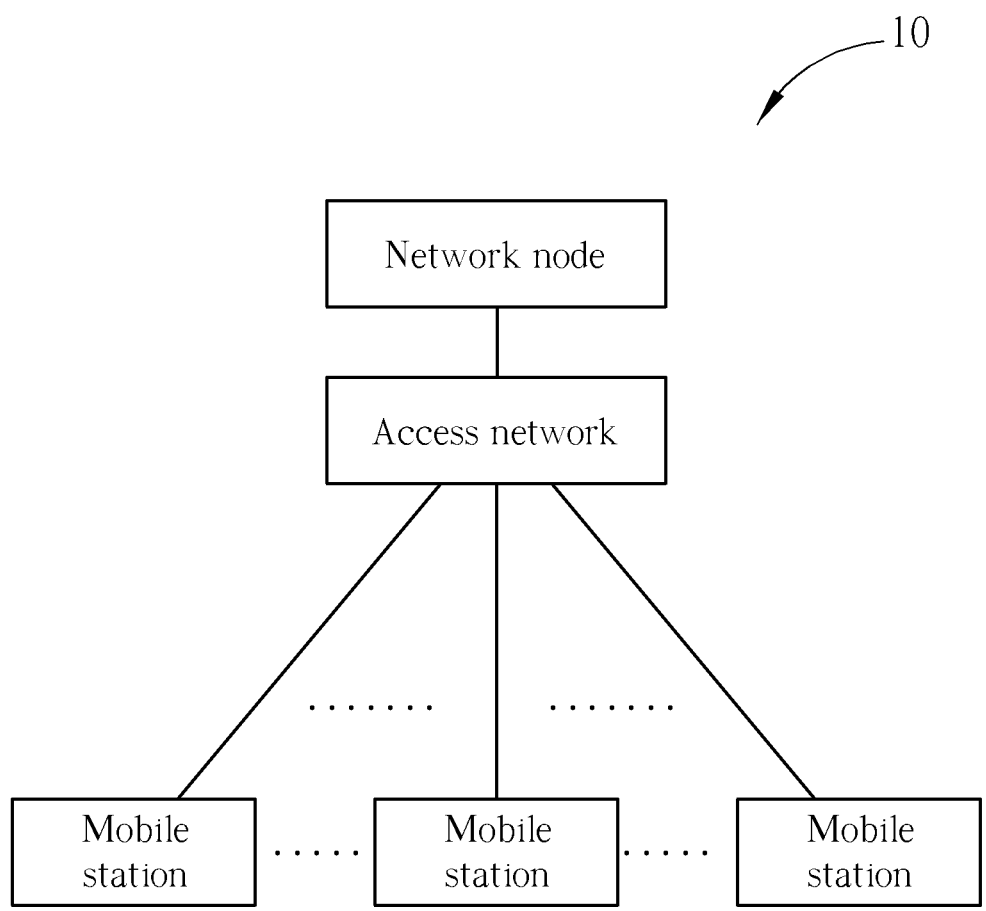
FIG. 1 illustrates a schematic diagram of an exemplary wireless communication system.

Please refer to FIG. 1, which illustrates a schematic diagram of an exemplary wireless communication system 10. Briefly, the wireless communication system 10 is composed of a network node, an access network and a plurality of mobile stations (MSs). The wireless communication system 10 can be a GPRS (General Packet Radio Service) system, or any other similar network system such as a GSM (Global System for Mobile communications) system, a UMTS (Universal Mobile Telecommunications System) system, an LTE (long-term evolution) or LTE-Advance system.

In GPRS system, the access network is referred as a Universal Terrestrial Radio Access Network (UTRAN) comprising and a plurality of NBs (Node Bs). GPRS enables data transfers through cellular networks. It is used for mobile internet, MMS and other data communications. In theory the speed limit of GPRS is 115 kbps, but in most networks it is around 35 kbps. The network node may be referred to as a Serving GPRS Support Node (SGSN) in GPRS system, which is responsible for the delivery of data packets to the mobile devices back and forth within its geographical service area, including packet routing and transfer, mobility management (attach/detach and tracking area management), session management (PDP Context establishment/disconnect), logical link management, and authentication and charging functions. The access network of the LTE system comprises a plurality of base stations such as an E-UTRAN (evolved-UTAN), which comprises a plurality of evolved Node-Bs (eNBs). In LTE system, the network node is referred to as a mobility management entity (MME).

The MS can be devices such as mobile phones, computer systems, etc. This terminology will be used throughout the application for ease of reference, however, this should not be construed as limiting the disclosure to any one particular type of access network. In some examples, the access network and the MS may be seen as a transmitter or receiver according to transmission direction, e.g., for uplink (UL), the MS is the transmitter and the access network is the receiver, and for downlink (DL), the access network is the transmitter and the UE is the receiver.

A MS camped normally on a cell performs a normal attach procedure to get emergency bearer services. The MS sends attach request message with attach type "GPRS attach" or combined attach depending on network mode of operation (NMO) of the cell. The attach procedure is rejected by the network node with GPRS mobility management (GMM) back-off timer when the network node is applying General (non-access stratum) NAS level congestion control.

Figure 2:
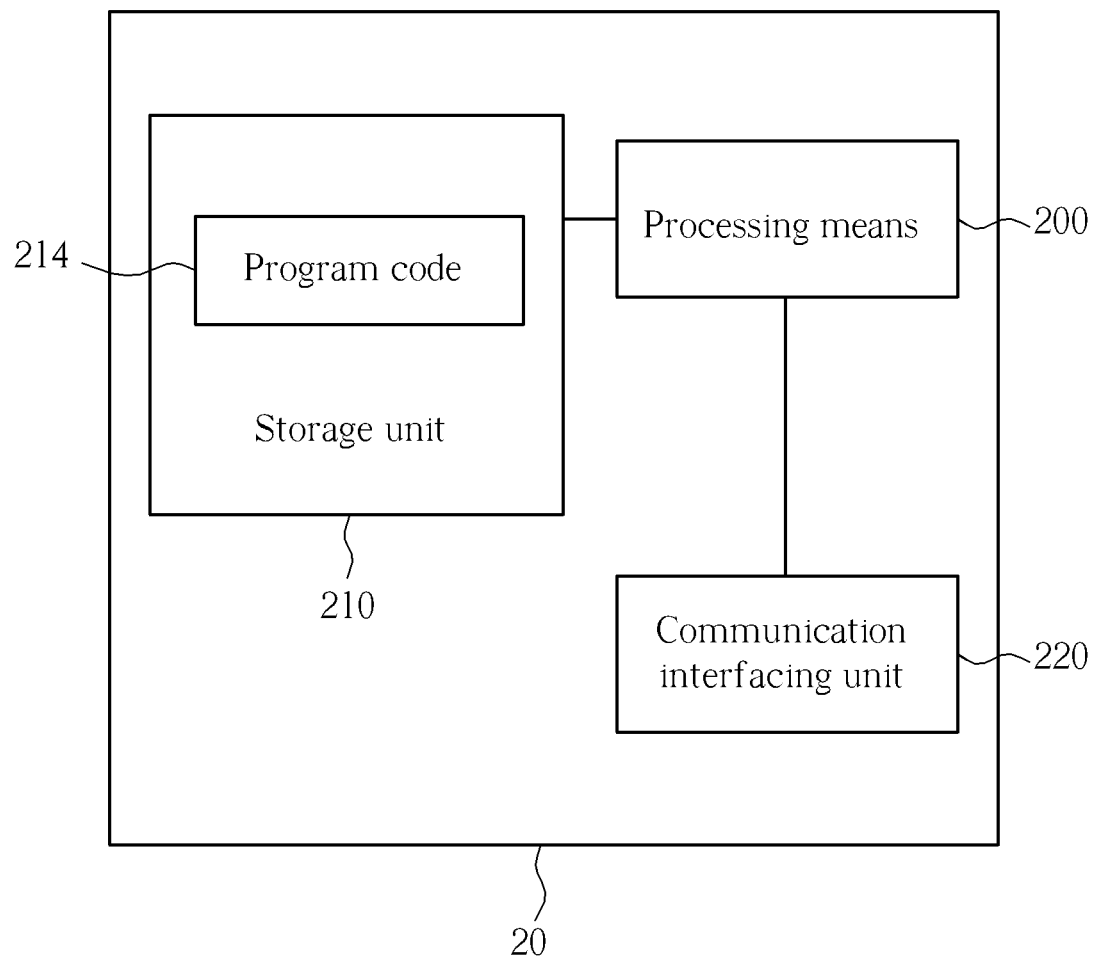
FIG. 2 is a schematic diagram of an exemplary communication device.

Please refer to FIG. 2, which is a schematic diagram of an exemplary communication device 20. The communication device 20 can be the MSs, the network node or the access network shown in FIG. 1, but is not limited herein. The communication device 20 may include a processing means 200 such as a microprocessor or an Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, hard disk, and optical data storage device. The communication interfacing unit 220 is preferably a transceiver and can handle timer configuration according to processing results of the processor 200.

Figure 3:
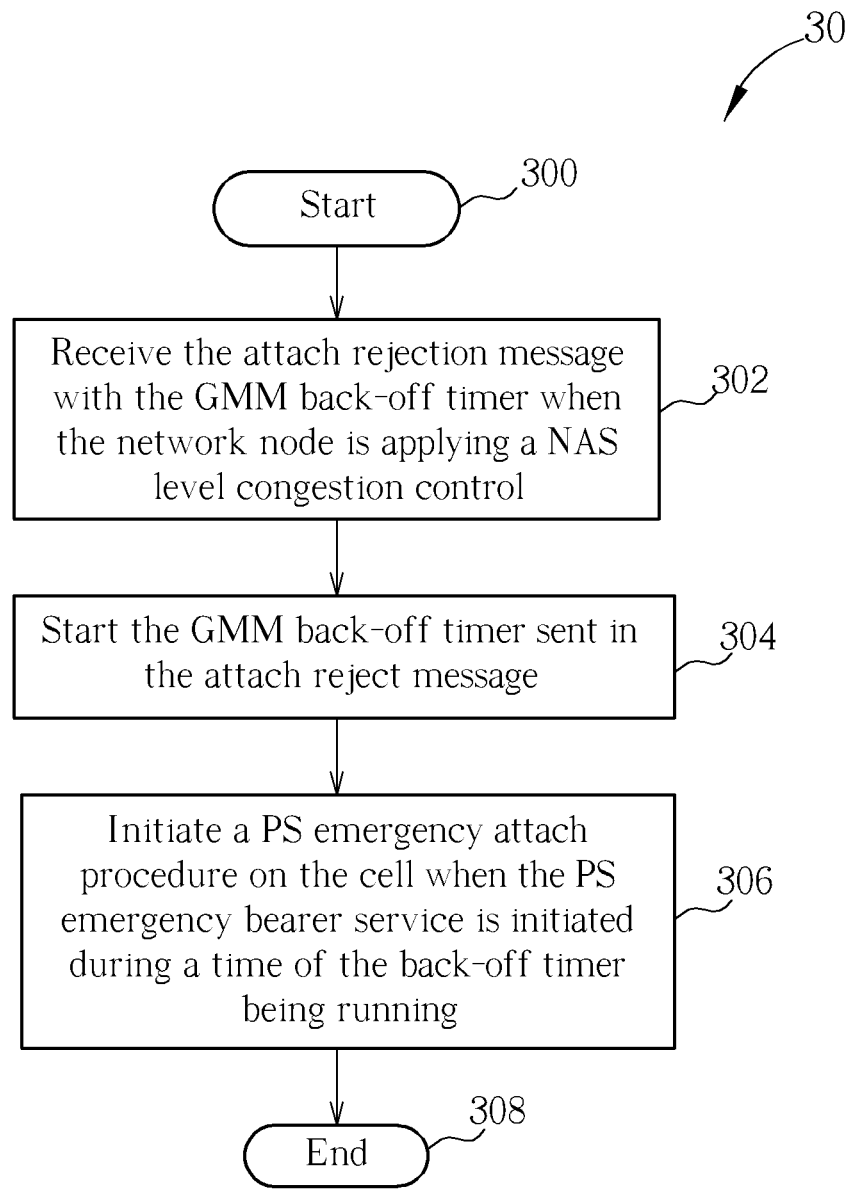
FIG. 3 is a flow chart of an exemplary process.

Please refer to FIG. 3, which is a flow chart of an exemplary process 30. The process 30 is used for handling a packet switch (PS) emergency bearer service for a MS in a wireless communication system. The MS can be one of the MSs in the wireless communication system 10. The MS initiates GPRS attach procedure on a cell providing normal services to the MS on sending attach request message with attach type "GPRS attach" or "combined GPRS/IMSI attach". The network node rejects the attach procedure by sending attach reject message with a GMM back-off timer due to NAS level congestion. The process 30 may be compiled into the program code 214 and includes the following steps:

Step 300: Start.

Step 302: Receive the attach rejection message with the GMM back-off timer when the network node is applying a NAS level congestion control.

Step 304: Start the GMM back-off timer sent in the attach reject message.

Step 306: Initiate a PS emergency attach procedure on the cell when the PS emergency bearer service is initiated during a time of the back-off timer being running.

Step 308: End.

According to the process 30, the MS camped normally on the cell gets rejected by the network node (e.g. SGSN) due to the NAS level congestion and receives the attach rejection message with the GMM back-off timer when the network node is applying the NAS level congestion control. The NAS level congestion control may be caused by a general NAS level congestion in the network node or an access point name (APN) congestion in the network node. The MS starts the GMM back-off timer upon the reception of the attach reject message. When the PS emergency bearer service is initiated during a time of the back-off timer being running, the MS initiates a PS emergency attach procedure. To initiate the PS emergency attach procedure, the MS sends an attach request message with an emergency attach type to the network node. The PS emergency bearer service, preferably, is an IP Multimedia Subsystem (IMS) emergency call.

When the network node receives the emergency attach type in the attach request message during the time of the back-off timer being running, the network node prioritizes the PS emergency attach procedure for the emergency bearer services, for example, responding the MS with an attach accept message. In the prior art, the MS gets rejected again since the network node does not know the attach procedure is for the emergency bearer services. According to the process 30, the network node is aware that the attach request message is for emergency bearer services upon the received emergency attach type. As a result, the MS can perform the PS emergency attach procedure to the network node when the PS emergency bearer service is initiated during the time of the back-off timer being running.

Figure 4:
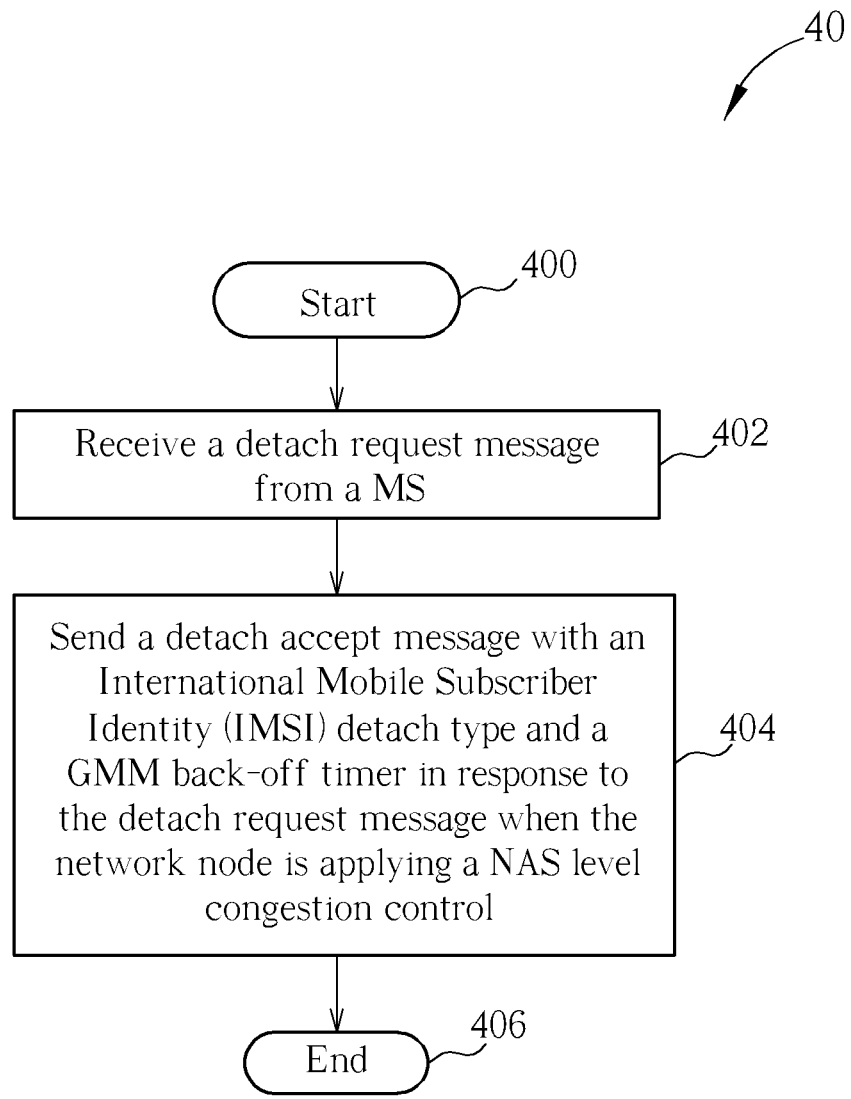
FIG. 4 is a flow chart of an exemplary process.

Please refer to FIG. 4, which is a flow chart of an exemplary process 40. The process 40 is used for a congestion control for a network node in a wireless communication system. The network node can be referred as to the network node in the wireless communication system 10. The process 40 may be compiled into the program code 214 and includes the following steps:

Step 400: Start.

Step 402: Receive a detach request message from a MS.

Step 404: Send a detach accept message with an International Mobile Subscriber Identity (IMSI) detach type and a GMM back-off timer in response to the detach request message when the network node is applying a NAS level congestion control.

Step 406: End.

According to the process 40, the network node (e.g. SGSN) receives the detach request message from the MS. The MS can be one of the MSs shown in FIG. 1 and is attached for a circuit switched (CS) or packet switched (PS) service on a cell with NMOI or is configured to use to an extend NMO I system information. The MS attached for combined CS/PS service sends the detach request message to the network node when the MS initiates a detach procedure to detach from CS services. The network node sends a detach accept message with the IMSI detach type and the GMM back-off timer in the detach accept message when the network node is applying the NAS level congestion control. In the prior, the network node is not able to send the GMM back-off timer in the detach accept message when the network node is applying the NAS level congestion control. In the example of the disclosure, the GMM back-off timer is sent with the IMSI detach type in the detach accept message.

When the MS receives the detach accept messages with the GMM back-off timer and the IMSI detach type, the MS runs the GMM back-off timer. The MS does not initiate any GMM signaling for normal services till the GMM back-off timer expires. Please note that, the detach procedure can be a detach procedure carrying IMSI detach type, GPRS detach type or combined GPRS/IMSI detach type. Namely, the aforementioned process 40 can be applied to the detach procedure with IMSI detach type, GPRS detach type or combine GPRS/IMSI detach type.

Thus, the network node is able to send the GMM back-off timer in the detach accept message and the MS does not initiates any non-emergency GMM signaling when the GMM back-off timer is still running. As a result, this helps to improve the congestion control.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processing means 200 processes the program code 214 related to the abovementioned processes and the processed results can handling an emergency call in the wireless communications system 10.

To sum up, according the exemplary process 30 the network node is informed that the attach request message is for emergency purpose through the emergency attach type and does not reject the attach procedure when the GMM back-off timer is running. According to the exemplary process 40, the network node is able to send the GMM back-off timer in the detach accept message and the MS does not initiates any non-emergency GMM signaling when the GMM back-off timer is still running. Both of processes improve the NAS level congestion control.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling an emergency bearer service for a mobile station in a wireless communication system, the method comprising:

the mobile station camping normally on a cell;

the mobile station receiving an attach rejection message with a back-off timer when a network node is applying a non-access stratum (NAS) level congestion control, wherein the attach rejection message is used for rejecting a normal attach procedure;

the mobile station initiating a packet switch (PS) emergency attach procedure when a PS emergency bearer service is initiated during a time of the back-off timer being running, wherein initiating the PS emergency attach procedure comprises sending an attach request message with an emergency attach type to the network node; and the mobile station receiving an attach accept message from the network node when the network node prioritizes the PS emergency attach procedure for the emergency bearer service, wherein the network node prioritizes the PS emergency attach procedure for the emergency bear service when the network node receives the attach request message with the emergency attach type and the back-off timer is running.

2. The method of claim 1, wherein the mobile station is camped on a normal cell providing a plurality of normal services.

3. The method of claim 1, wherein the NAS congestion control is applied due to a general NAS level congestion in the network node or an access point name (APN) congestion in the network node.

4. The method of claim 1, wherein the back-off timer is a (GPRS Mobility Management) GMM back-off timer.

5. A method of handling a congestion control for a network node in a wireless communication system, the method comprising:

receiving a detach request message from a mobile station, wherein the mobile station is attached for a circuit switched (CS) or packet switched (PS) service on a cell with a network mode of operation I (NMOI) or is configured to use to an extend NMOI system information; and sending a detach accept message with an International Mobile Subscriber Identity (IMSI) detach type and a back-off timer to the mobile station in response to the detach request message when the network node is applying a non-access stratum (NAS) level congestion control.

6. The method of claim 5, wherein the detach request message is used for the mobile station to detach an IMSI service.

7. The method of claim 5 further comprising the mobile station running the back-off timer up reception of the detach accept message.

8. The method of claim 5 further comprising the mobile station not initiating any GMM signaling for normal services till the back-off timer expires.

9. The method of claim 5 further comprising the mobile station initiating a detach procedure with IMSI detach type, GPRS detach type or combine GPRS/IMSI detach type.

* * * * *